United States Patent
Park et al.

(10) Patent No.: US 10,249,397 B2
(45) Date of Patent: Apr. 2, 2019

(54) MODULAR REACTOR STEAM GENERATOR CONFIGURED TO COVER A REACTOR OUTER WALL CIRCUMFERENCE

(71) Applicant: KEPCO ENGINEERING & CONSTRUCTION COMPANY, INC., Gimcheon-si, Gyeongsangbuk-do (KR)

(72) Inventors: Sung Ho Park, Daejeon (KR); Jong Min Kim, Daejeon (KR); Kyu Wan Kim, Gimcheon-si (KR)

(73) Assignee: KEPCO ENGINEERING & CONSTRUCTION COMPANY, INC., Gyeonggi-Do (KR)

( * ) Notice: Subject to any disclaimer, the term of this patent is extended or adjusted under 35 U.S.C. 154(b) by 396 days.

(21) Appl. No.: 15/445,376

(22) Filed: Feb. 28, 2017

(65) Prior Publication Data

US 2018/0033505 A1 Feb. 1, 2018

(30) Foreign Application Priority Data

Jul. 28, 2016 (KR) .......................... 10-2016-0096128

(51) Int. Cl.
*G21D 1/00* (2006.01)
*F22B 21/04* (2006.01)
(Continued)

(52) U.S. Cl.
CPC ................ *G21D 1/006* (2013.01); *F16T 1/00* (2013.01); *F22B 21/04* (2013.01); *G21C 1/322* (2013.01);
(Continued)

(58) Field of Classification Search
CPC . G21D 1/006; F16T 1/00; F22B 21/04; G21C 1/322; G21C 15/12; G21C 15/16
(Continued)

(56) References Cited

U.S. PATENT DOCUMENTS 3,331,747 A * 7/1967 Williamson ........... G21C 1/322
376/406
4,818,476 A * 4/1989 Gasparro ............... G21C 13/06
376/294

(Continued)

FOREIGN PATENT DOCUMENTS

KR            100286518 B1    1/2000
KR         1020150014491 A    2/2015
(Continued)

OTHER PUBLICATIONS

Office Action dated Nov. 15, 2016 of the Korean Patent Application No. 10-2016-0096128.

*Primary Examiner* — Jack W Keith
*Assistant Examiner* — Daniel Wasil
(74) *Attorney, Agent, or Firm* — Nixon Peabody LLP; Jeffrey L. Costellia

(57) ABSTRACT

In an externally integrated steam generator type small modular reactor, a steam generator is arranged along the circumference of a reactor vessel cylindrical shell, and a steam drum is arranged along the circumference of the steam generator. The small modular reactor includes: a nuclear reactor including a hemispherical upper head, the reactor vessel cylindrical shell coupled to the upper head and extending downward from the upper head in a cylindrical shape, and a hemispherical lower head provided on a lower portion of the reactor vessel cylindrical shell, wherein a core is placed in the nuclear reactor; the steam generator surrounding all around the reactor vessel cylindrical shell and including a first penetration hole communicating with an inside of the nuclear reactor; and the steam drum surrounding the circumference of the steam generator and including a second penetration hole communicating with an inside of the steam generator.

16 Claims, 11 Drawing Sheets

(51) Int. Cl.
*G21C 15/12* (2006.01)
*F16T 1/00* (2006.01)
*G21C 1/32* (2006.01)
*G21C 15/16* (2006.01)

(52) U.S. Cl.
CPC .............. *G21C 15/12* (2013.01); *G21C 15/16* (2013.01); *Y02E 30/40* (2013.01)

(58) Field of Classification Search
USPC ........................................ 376/317, 395, 402
See application file for complete search history.

(56) References Cited

U.S. PATENT DOCUMENTS

| | | |
|---|---|---|
| 9,206,978 B2 | 12/2015 | Evans et al. |
| 9,478,317 B2 | 10/2016 | Faith et al. |
| 2013/0121453 A1* | 5/2013 | Shargots ................ G21C 1/322 376/395 |
| 2013/0182813 A1* | 7/2013 | Bingham ................ G21C 1/322 376/293 |

FOREIGN PATENT DOCUMENTS

| | | |
|---|---|---|
| KR | 1020150014514 A | 2/2015 |
| KR | 1020160081081 A | 7/2016 |

\* cited by examiner

MODULAR REACTOR STEAM GENERATOR CONFIGURED TO COVER A REACTOR OUTER WALL CIRCUMFERENCE

CROSS-REFERENCE TO RELATED APPLICATION

This application claims the benefit of Korean Patent Application No. 10-2016-0096128, filed on Jul. 28, 2016, in the Korean Intellectual Property Office, the disclosure of which is incorporated herein in its entirety by reference.

BACKGROUND

1. Field

One or more embodiments relate to an externally integrated steam generator type small modular reactor for a nuclear power plant, and more particularly, to an externally integrated steam generator type small modular reactor in which a steam generator is arranged along the circumference of a reactor vessel and a steam drum is arranged along the circumference of the steam generator in order to increase the heat transfer area of the steam generator, simplify the structure of the small modular reactor, and increase the spatial efficiency of the small modular reactor.

2. Description of the Related Art

In general, a reactor coolant system of a large pressurized-water reactor nuclear power plant includes a nuclear reactor, steam generators, reactor coolant pumps, and pipes connecting the components. The reactor coolant system may have a loop structure in which two to four steam generators are arranged around the nuclear reactor, one or two reactor coolant pumps are arranged for each of the steam generators, and pipes are welded to nozzles of the components. The steam generators include heat transfer U-tubes, evaporators, moisture separators, and steam dryers.

In such a reactor coolant system of a large pressurized-water reactor nuclear power plant, pipes for connecting components to a nuclear reactor, steam generators, and reactor coolant pumps are individually installed. However, it is difficult to repair and maintain the pipes installed as described above, and basically, accidents such as leakage of a coolant may occur because of pipe break.

That is, large nuclear power plants have to be designed by assuming break at both ends of pipes exposed to high pressure and high temperature and considering factors such as dynamic loads and pressure surges caused by break at both ends of pipes and are required to satisfy complex design specifications including environment verification so as to maintain integrity and functional stability in radioactivity and steam conditions in case of coolant leakage.

Meanwhile, small-medium modular reactors are designed to have an integrated structure in which steam generators and reactor coolant pumps are integrated in a nuclear vessel for removal of connection pipes and pipe welding. FIG. 1 illustrates a small-medium modular reactor of the related art including a steam generator 20 provided in a reactor vessel 10.

Referring to FIG. 1, the small-medium modular reactor of the related art includes the reactor vessel 10, the steam generator 20 provided in the reactor vessel 10, a core 30, turbines 40, and motor pumps 50. Since the steam generator 20 is installed in the reactor vessel 10, pipes may not be used in the small-medium modular reactor of the related art.

However, the small-medium modular reactor of the related art may have the following problems.

In the small-medium modular reactor of the related art, a complex structure is used to maintain a pressure boundary between secondary cooling water used in the steam generator 20 provided in the reactor vessel 10 and primary cooling water used for circulating heat generated in the core 30. That is, in the small-medium modular reactor in which the steam generator 20 is provided in the reactor vessel 10, a pressure boundary between primary cooling water and secondary cooling water is scattered in the reactor vessel 10, and thus a complex structure is used to maintain the pressure boundary.

Furthermore, since the steam generator 20 is provided in the reactor vessel 10 of the small-medium modular reactor of the related art, the small-medium modular reactor has a limited degree of spatial efficiency and a complex structure. For example, since additional structures (such as the turbines 40) are arranged in the reactor vessel 10 to form paths for coolant pumps, the structure of the small-medium modular reactor is complicated. If the structure of the small-medium modular reactor is complicated as described above, access to the small-medium modular reactor is limited, thereby making it difficult to perform in-service inspection, repair, and maintenance and causing problems such as limited workability and an increase in the use of anti-radiation suits. Therefore, the operability and stability of the small-medium modular reactor may decrease.

Furthermore, in the small-medium modular reactor in which the steam generator 20 is provided in the reactor vessel 10, moisture separators and steam dryers may not be installed in the steam generator 20 but may have to be installed in separate components outside the steam generator 20.

A pressurizer of a large nuclear power plant is installed in a reactor coolant system as an independent component, and the temperature of a fluid in the pressurizer is markedly different from the temperature of the fluid in a reactor coolant system pipe according to operational states. In this case, a thermal stratification flow may occur in a surge line connecting the pressurizer and the coolant pipe, thereby causing a large degree of stress and requiring a space and support structures for the surge line.

In the small-medium modular reactor of the related art in which the steam generator 20 is provided in the reactor vessel 10, a pressurizer 60 is integrated in an upper head 70 for removal of a surge line and an installation space. However, the complex structure of the small-medium modular reactor of the related art may limit access paths for inspection, repair, and maintenance of the inside of the pressurizer 60 and a penetration portion of the upper head 70.

RELATED ART DOCUMENT

Patent Document (Patent Document 1) Korean Patent Application Laid-open Publication No. 10-2014-0021121 (Feb. 20, 2014)

SUMMARY

One or more embodiments include an externally integrated steam generator type small modular reactor in which a steam generator is arranged along the circumference of a reactor vessel and a steam drum is arranged along the circumference of the steam generator so as to increase the heat transfer area of the steam generator, simplify the structure of the small modular reactor, and increase the spatial efficiency of the small modular reactor.

Additional aspects will be set forth in part in the description which follows and, in part, will be apparent from the description, or may be learned by practice of the presented embodiments.

According to one or more embodiments, an externally integrated steam generator type small modular reactor includes: a nuclear reactor including an upper head, a reactor vessel cylindrical shell having a cylindrical shape and coupled to the upper head, and a lower head provided on a lower portion of the reactor vessel, wherein a core is placed in the nuclear reactor; a steam generator surrounding all around the reactor vessel cylindrical shell and including a first penetration hole communicating with an inside of the nuclear reactor; and a steam drum surrounding all around the steam generator and including a second penetration hole communicating with an inside of the steam generator.

The steam generator may further include: a steam generator inner shell integrated with or formed in one piece with the reactor vessel cylindrical shell and surrounding 360 degrees a circumference of the reactor vessel cylindrical shell, the steam generator inner shell sharing a portion with the reactor vessel cylindrical shell and extending in a longitudinal direction of the reactor vessel cylindrical shell; and a steam generator outer shell spaced apart from the steam generator inner shell and surrounding 360 degrees the circumference of the reactor vessel cylindrical shell, the steam generator outer shell extending in the longitudinal direction of the reactor vessel cylindrical shell, wherein the steam drum may further include: a steam drum inner shell integrated with or formed in one piece with the steam generator outer shell and surrounding 360 degrees a circumference of the steam generator, the steam drum inner shell sharing a portion with the steam generator outer shell and extending in the longitudinal direction of the reactor vessel cylindrical shell; and a steam drum outer shell spaced apart from the steam drum inner shell and surrounding 360 degrees the circumference of the steam generator, the steam drum outer shell extending in the longitudinal direction of the reactor vessel cylindrical shell, wherein the first penetration hole may be provided in a region in which the reactor vessel cylindrical shell and the steam generator inner shell are integrated with or formed in one piece with each other and may be used as a flow path allowing a fluid to flow between the inside of the nuclear reactor and the inside of the steam generator, wherein the second penetration hole may be provided in a region in which the steam generator outer shell and the steam drum inner shell are integrated with or formed in one piece with each other and may be used as a flow path allowing a fluid to flow between the inside of the steam generator and an inside of the steam drum.

The steam generator may further include: a steam generator upper head connecting an upper portion of the steam generator inner shell to an upper portion of the steam generator outer shell; and a steam generator lower head connecting a lower portion of the steam generator outer shell to the reactor vessel cylindrical shell, wherein the steam generator upper head may have a semicircular or semielliptical cross section and may extend in a ring shape along the circumference of the steam generator, and the steam generator lower head may have a circular-arc cross section and may extend in a ring shape along the circumference of the steam generator. A manway may be detachably coupled to the steam generator upper head or the steam generator lower head.

A plurality of first partition plates may be arranged at intervals inside the steam generator along the circumference of the steam generator, steam generator modules each including a high-temperature part and a low-temperature part may be provided in spaces separated by the first partition plates, and each of the steam generator modules may include a second partition plate separating the high-temperature part and the low-temperature part from each other. The first penetration hole may include a first entrance penetration hole communicating with the high-temperature part and a first exit penetration hole communicating with the low-temperature part; a cylindrical core support barrel assembly extending in the longitudinal direction of the reactor vessel cylindrical shell and accommodating the core may be provided inside the nuclear reactor; and the core support barrel assembly may include a core penetration hole communicating with the first entrance penetration hole, and the first exit penetration hole may communicate with a space between the reactor vessel cylindrical shell and the core support barrel assembly.

A lower heat transfer tube sheet may be provided in a lower portion of the steam generator, the lower heat transfer tube sheet being coupled to the steam generator inner shell and the steam generator outer shell and having a plate shape along the circumference of the steam generator; an upper heat transfer tube sheet may be provided in an upper portion of the steam generator, the upper heat transfer tube sheet being coupled to the steam generator inner shell and the steam generator outer shell having a plate shape along the circumference of the steam generator; and the externally integrated steam generator type small modular reactor may further include a heat transfer tube coupled to the lower heat transfer tube sheet and the upper heat transfer tube sheet and extending straight from the lower heat transfer tube sheet to the upper heat transfer tube sheet. The lower heat transfer tube sheet or the upper heat transfer tube sheet may be integrated with or formed in one piece with the steam generator inner shell and the steam generator outer shell.

The steam drum may further include: a steam drum upper head connecting an upper portion of the steam drum inner shell to an upper portion of the steam drum outer shell; and a steam drum lower head connecting a lower portion of the steam drum inner shell to the steam generator outer shell, wherein the steam drum upper head may have a semicircular or semielliptical cross section and may extend in a ring shape along a circumference of the steam drum, and the steam drum lower head may have a circular-arc cross section and may extend in a ring shape along the circumference of the steam drum. A steam outlet nozzle may be formed in the steam drum upper head. A moisture separator and a steam dryer may be provided in the steam drum. The externally integrated steam generator type small modular reactor may further include a circular-arc shaped shroud extending from an inside of the steam drum lower head to an inside of the steam generator outer shell, the shroud extending in a ring shape along a circumference of the steam drum lower head and a circumference of the steam generator outer shell.

An electric heater may be installed on a pressurizer plate, and a surge hole may be formed in the pressurizer plate to allow a fluid to pass therethrough. A protrusion protruding inward from the nuclear reactor upper head and having a stud bolt hole may be provided on the nuclear reactor upper head protrusion, and the pressurizer plate may be coupled to the protrusion using a stud bolt.

A cylindrical shell flange may protrude inward from the reactor vessel cylindrical shell and may include a stud bolt hole, an upper head flange may protrude outward from the upper head and may include a stud bolt hole, and the upper head and the reactor vessel cylindrical shell may be coupled to each other by joining the cylindrical shell flange and the upper head flange using a stud bolt. The externally integrated steam generator type small modular reactor may be manufactured by coupling a plurality of forged members to each other.

A space formed on an upper portion of the reactor vessel cylindrical shell and surrounded by the steam generator inner shell may be configured to be filled with a reactor coolant and can be utilized as a refueling pool during refueling operation.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
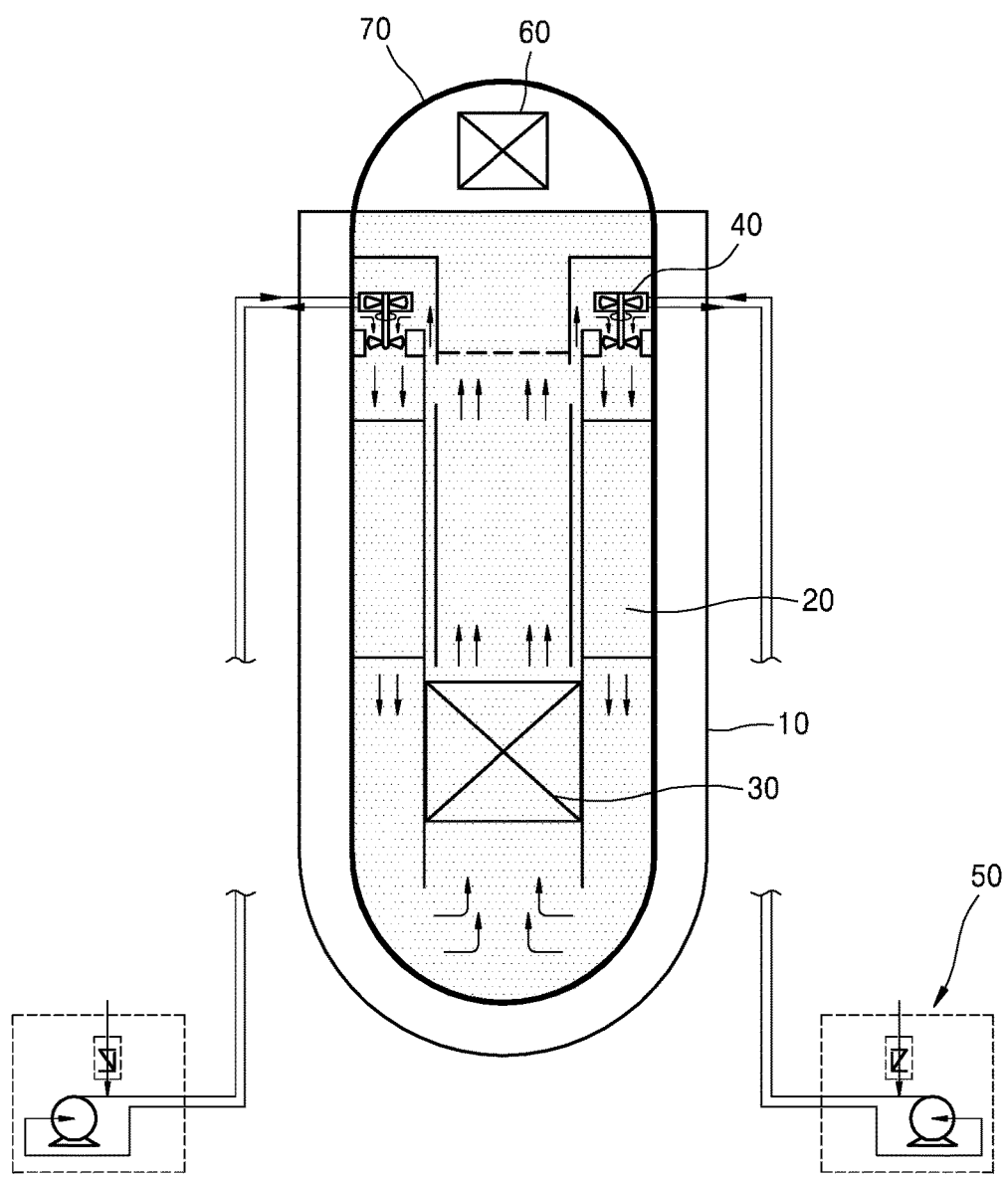
FIG. 1 is a view illustrating a typical internally integrated steam generator type reactor of the related art.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed.

One or more embodiments relate to an externally integrated steam generator type small modular reactor in which a steam generator is arranged along the circumference of a reactor vessel and a steam drum is arranged along the circumference of a steam generator so as to increase the heat transfer area of the steam generator, simplify the structure of the small modular reactor, and increase the spatial efficiency of the small modular reactor.

According to an embodiment, the externally integrated steam generator type small modular reactor includes: a nuclear reactor 110 including an upper head 111, a reactor vessel cylindrical shell 112, and a lower head 113; a steam generator 130; and a steam drum 160. The externally integrated steam generator type small modular reactor is configured to increase the heat transfer area of the steam generator 130 and have a simple structure and a high degree of spatial efficiency. In the externally integrated steam generator type small modular reactor of the embodiment, the steam generator 130 surrounds the circumference of the reactor vessel cylindrical shell 112 and includes first penetration holes 120 communicating with the inside of the nuclear reactor 110. In addition, the steam drum 160 surrounds the circumference of the steam generator 130 and includes second penetration holes 150 communicating with the inside of the steam generator 130.

Figure 2:
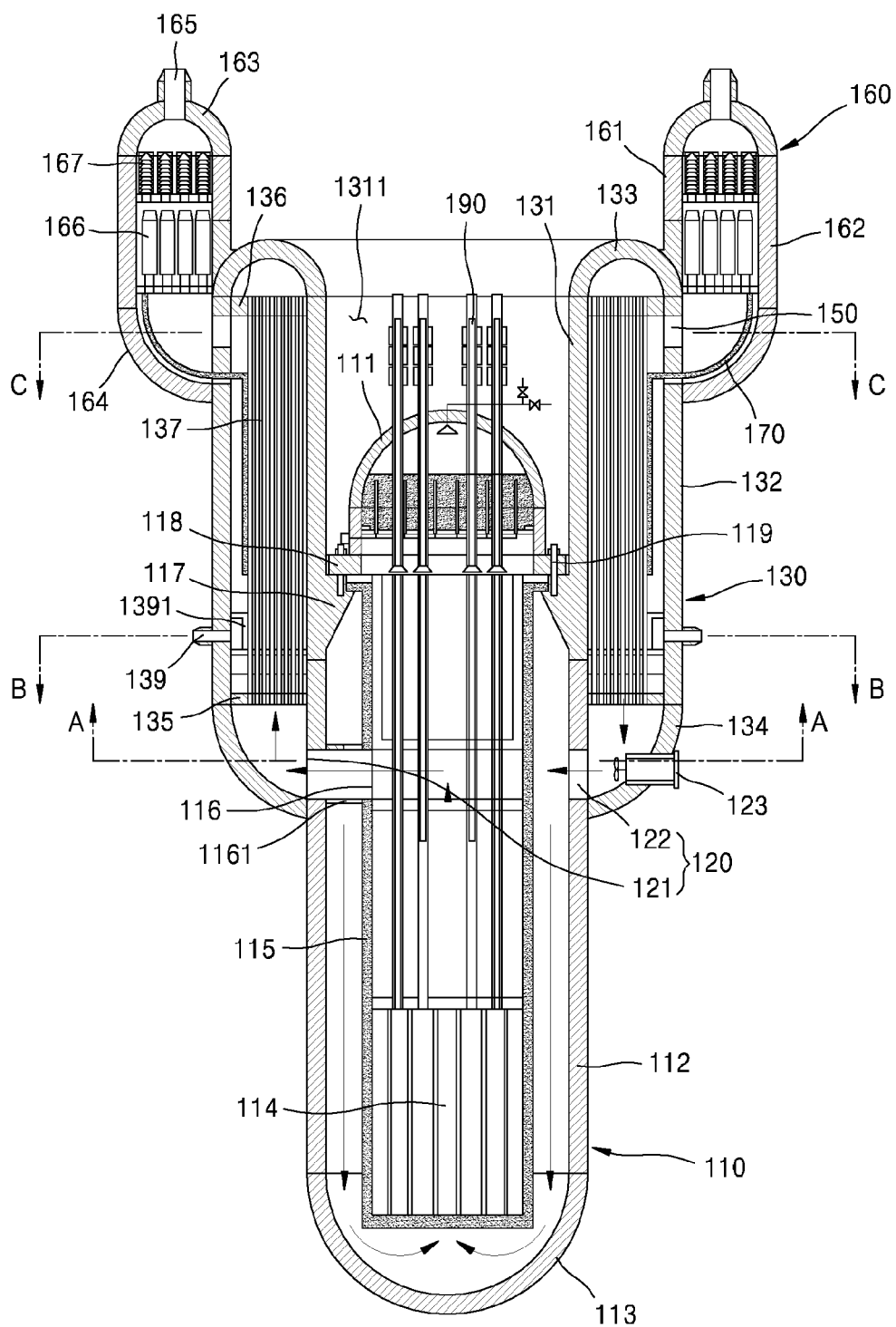
FIG. 2 is a view illustrating an externally integrated steam generator type small modular reactor according to an embodiment.

Referring to FIG. 2, the nuclear reactor 110 includes: the upper head 111; the reactor vessel cylindrical shell 112 coupled to the upper head 111 and having a cylindrical shape; and the lower head 113 provided on a lower portion of the nuclear reactor 110. A core 114 is provided inside the nuclear reactor 110. The upper head 111 may be variously shaped. For example, the upper head 111 may have a hemispherical shape. The reactor vessel cylindrical shell 112 is coupled to the upper head 111 and extends downward from the upper head 111. The upper head 111 and the reactor vessel cylindrical shell 112 may be coupled to each other using an upper head flange 118 provided on the upper head 111 and a cylindrical shell flange 117 provided on the reactor vessel cylindrical shell 112. The lower head 113 may be variously shaped. For example, the lower head 113 may have a hemispherical shape.

The steam generator 130 surrounds the circumference of the reactor vessel cylindrical shell 112 and includes the first penetration holes 120 communicating with the inside of the nuclear reactor 110.

The steam generator 130 includes: a steam generator inner shell 131 integrated with or formed in one piece with the reactor vessel cylindrical shell 112 and surrounding 360 degrees the circumference of the reactor vessel cylindrical shell 112, the steam generator inner shell 131 sharing a portion with the reactor vessel cylindrical shell 112 and extending in a longitudinal direction of the reactor vessel cylindrical shell 112; and a steam generator outer shell 132 spaced apart from the steam generator inner shell 131 and surrounding 360 degrees the circumference of the reactor vessel cylindrical shell 112, the steam generator outer shell 132 extending in the longitudinal direction of the reactor vessel cylindrical shell 112.

The steam generator inner shell 131 is integrated with or formed in one piece with the reactor vessel cylindrical shell 112. The steam generator outer shell 132 is spaced apart from the steam generator inner shell 131 and surrounding 360 degrees the circumference of the reactor vessel cylindrical shell 112 and extends upward from the reactor vessel cylindrical shell 112 in the longitudinal direction of the reactor vessel cylindrical shell 112 (here, the longitudinal direction of the reactor vessel cylindrical shell 112 is a direction in which the upper head 111, the reactor vessel cylindrical shell 112, and the lower head 113 are arranged).

Figure 3:
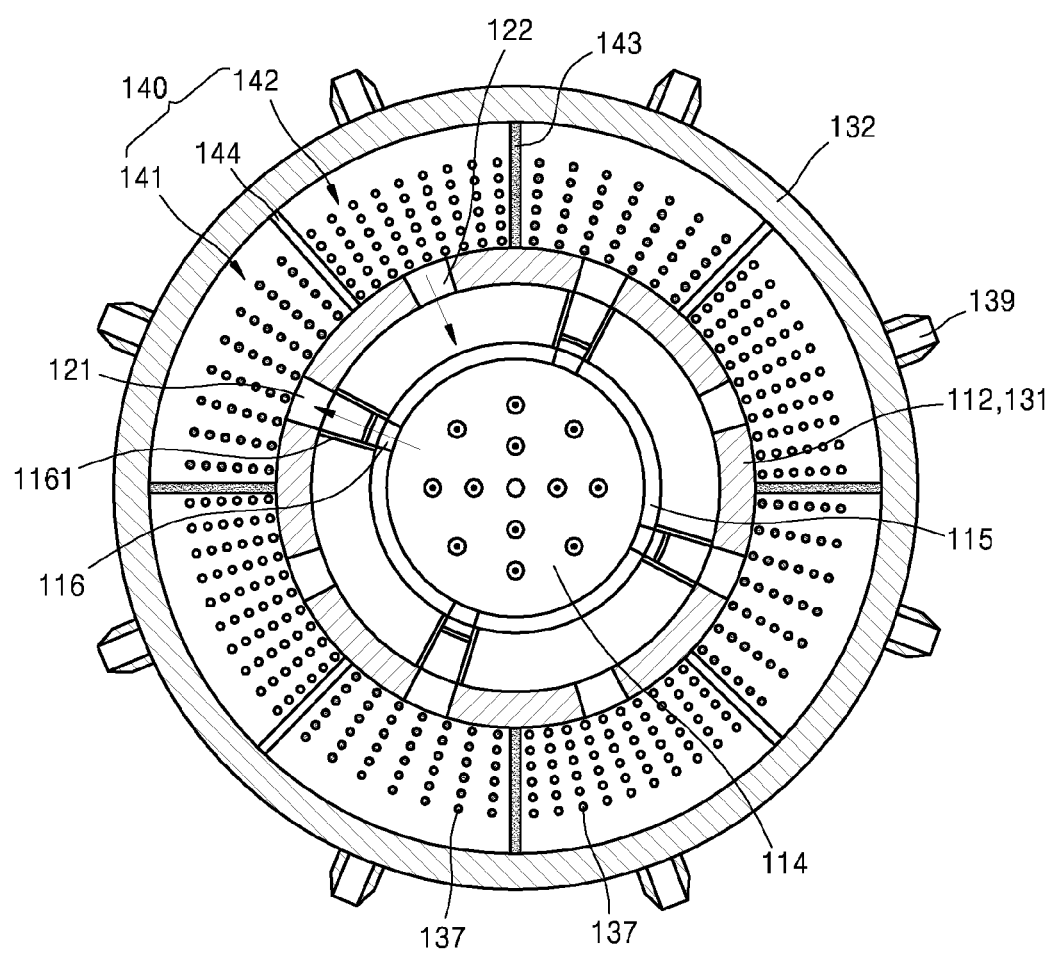
FIG. 3 is a cross sectional view taken along a line A-A of FIG. 2, illustrating an based on the line A-A according to an embodiment.

The steam generator inner shell 131 and the steam generator outer shell 132 surround the reactor vessel cylindrical shell 112 and have a doughnut-shaped cross section. Referring to FIG. 3, the steam generator inner shell 131 and the steam generator outer shell 132 have a doughnut-shaped cross section in which the nuclear reactor 110 is placed.

The steam generator 130 may further include: a steam generator upper head 133 connecting an upper portion of the steam generator inner shell 131 to an upper portion of the steam generator outer shell 132; and a steam generator lower head 134 connecting a lower portion of the steam generator outer shell 132 to the reactor vessel cylindrical shell 112.

The steam generator upper head 133 has a semicircular cross section and extends in a ring shape along the circumference of the steam generator 130. That is, the steam generator upper head 133 has a semicircular cross section and surrounds an upper portion of the steam generator 130 in a doughnut shape. Since the steam generator upper head 133 has a semicircular cross section, a space in which a fluid may stay may be formed. Instead of having a semicircular cross section, the steam generator upper head 133 may have another cross sectional shape such as a semielliptical shape.

The steam generator lower head 134 has a circular-arc cross section and extends in a ring shape along the circumference of the steam generator 130. That is, the steam generator lower head 134 has a circular-arc cross section and connects the steam generator outer shell 132 to the reactor vessel cylindrical shell 112 while surrounding a lower portion of the steam generator 130 in a doughnut shape. Since the steam generator lower head 134 has a circular-arc cross section, a fluid may smoothly flow along the shape of the steam generator lower head 134. In a non-limiting example, the steam generator lower head 134 may have a quarter-circular cross section. However, the steam generator lower head 134 may have another circular-arc cross sectional shape.

The first penetration holes 120 function as flow paths allowing a fluid to flow between the inside of the nuclear reactor 110 and the inside of the steam generator 130. That is, openings are formed in the steam generator 130 to allow a fluid to flow from or to the inside of the nuclear reactor 110. In other words, owing to the first penetration holes 120, the steam generator 130 is connected to the nuclear reactor 110 without using pipes, and a fluid may flow therebetween. The first penetration holes 120 may be provided in a region in which the steam generator inner shell 131 and the reactor vessel cylindrical shell 112 are integrated with or formed in one piece with each other. For example, the first penetration holes 120 may be formed between a lower portion of the steam generator inner shell 131 and a position at which the steam generator lower head 134 and the reactor vessel cylindrical shell 112 are coupled to each other.

Figure 4:
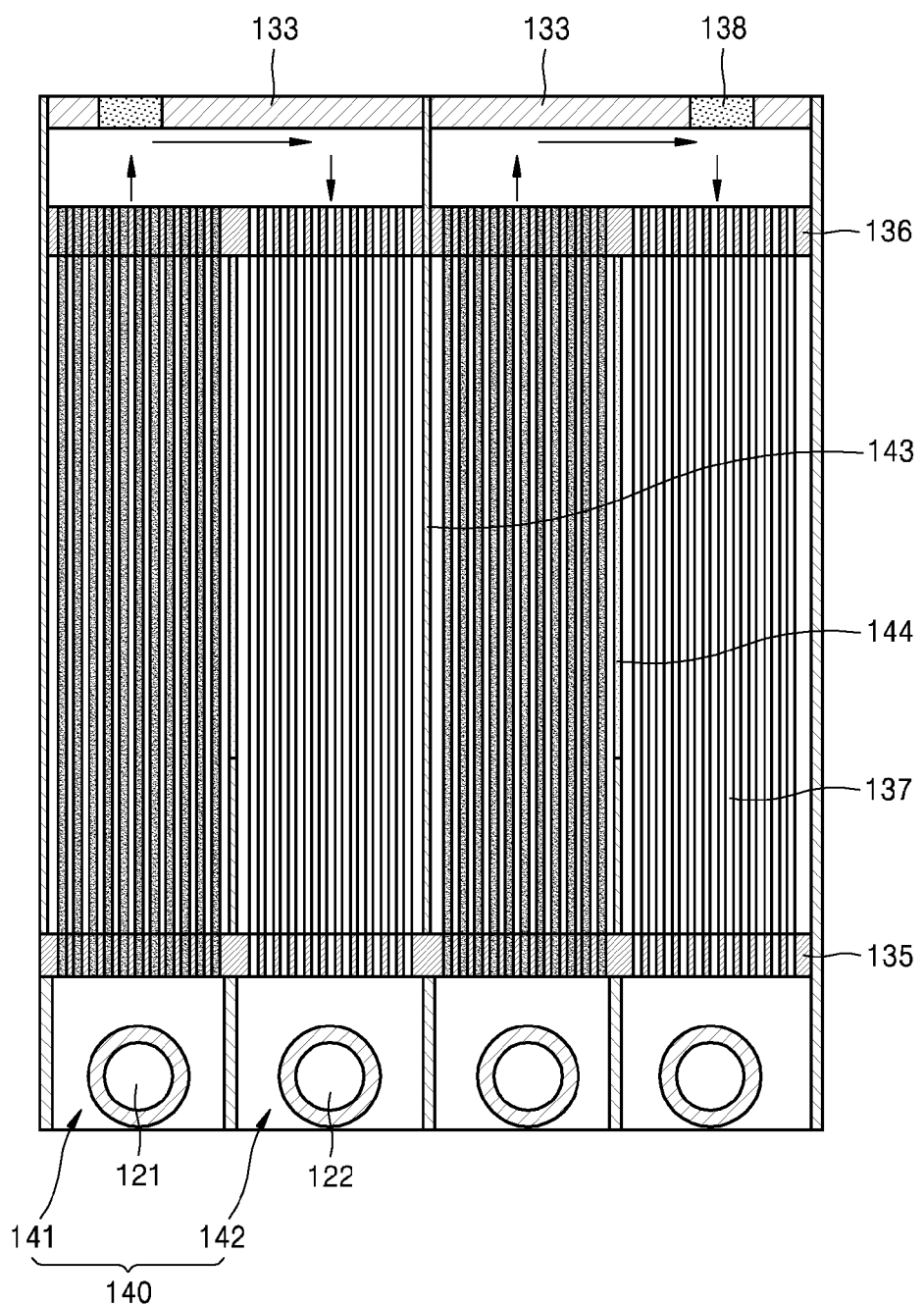
FIG. 4 is a view illustrating high-temperature and low-temperature parts and the flow of a fluid in the high-temperature and low-temperature parts according to an embodiment.
Figure 5:
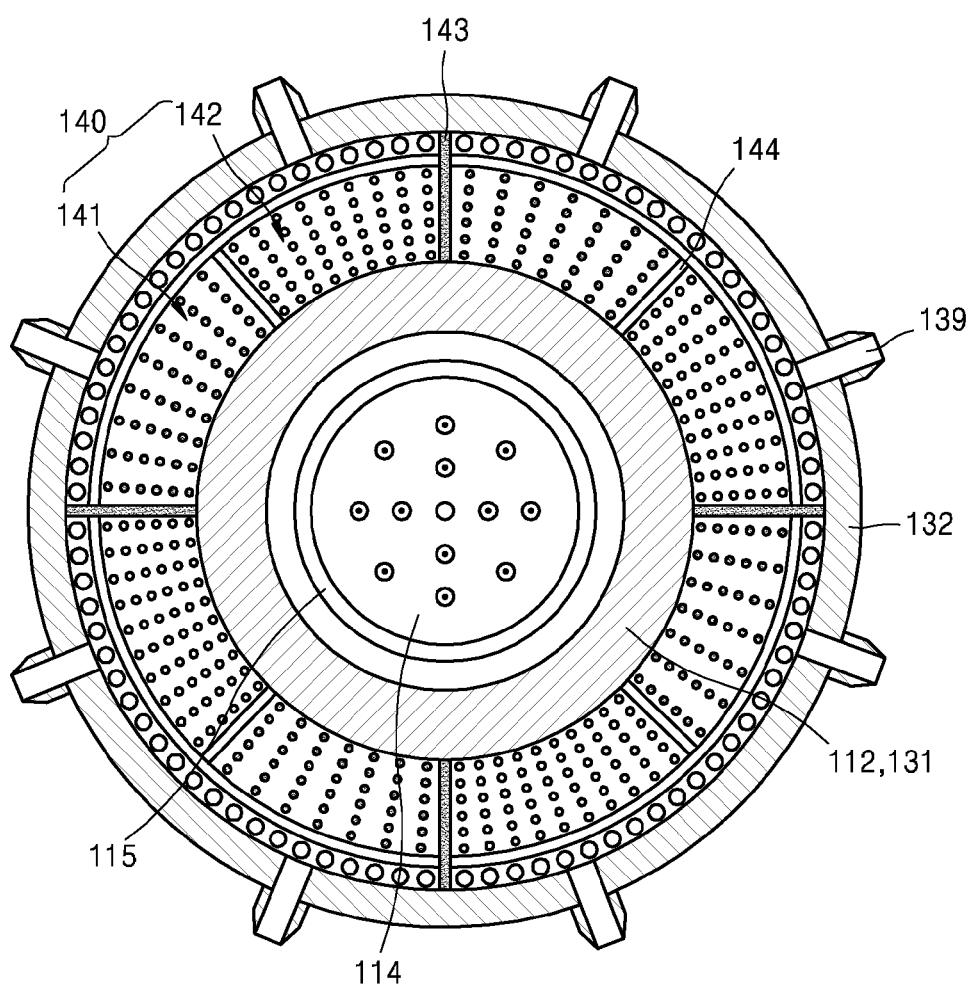
FIG. 5 is a cross sectional view taken along a line B-B of FIG. 2, illustrating a lower portion of the externally integrated steam generator type small modular reactor based on the line B-B according to an embodiment.

Referring to FIGS. 3 to 5, a plurality of first partition plates 143 are arranged at intervals inside the steam generator 130 along the circumference of the steam generator 130. The first partition plates 143 extend in the longitudinal direction of the reactor vessel cylindrical shell 112 and divide an inner space of the steam generator 130. Steam generator modules 140 each including a high-temperature part 141 and a low-temperature part 142 are arranged in the divided inner space of the steam generator 130. That is, the steam generator modules 140 are independently arranged in the inner space of the steam generator 130 divided by the first partition plates 143. Each of the steam generator modules 140 is divided into the high-temperature part 141 and the low-temperature part 142 by a second partition plate 144.

Referring to FIG. 4, the high-temperature parts 141 and the low-temperature parts 142 are related to the flow of a fluid in the nuclear reactor 110 (described later). Primary coolant temperature heated to a high temperature in the core 114 flows to the upper portion of the steam generator 130 through the high-temperature parts 141, and after passing through the low-temperature parts 142, the primary cooling water flows to the core 114. Heat transfer tubes 137 are arranged in the high-temperature parts 141 and the low-temperature parts 142.

A lower heat transfer tube sheet 135 coupled to the steam generator inner shell 131 and the steam generator outer shell 132 and having a plate shape along the circumference of the steam generator 130 is provided in the lower portion of the steam generator 130, and an upper heat transfer tube sheet 136 coupled to the steam generator inner shell 131 and the steam generator outer shell 132 and having a plate shape along the circumference of the steam generator 130 is provided in the upper portion of the steam generator 130.

The lower heat transfer tube sheet 135 and the upper heat transfer tube sheet 136 are respectively provided in the lower and upper portions of the steam generator 130, and each of the lower heat transfer tube sheet 135 and the upper heat transfer tube sheet 136 extends along the circumference of the steam generator 130 in a doughnut shape.

The lower heat transfer tube sheet 135 is placed above the steam generator lower head 134, and the upper heat transfer tube sheet 136 is placed below the steam generator upper head 133. The lower heat transfer tube sheet 135 and the upper heat transfer tube sheet 136 may be formed integrally with or in one piece with the steam generator inner shell 131 and the steam generator outer shell 132.

Holes may be formed in the lower heat transfer tube sheet 135 and the upper heat transfer tube sheet 136 so as to couple the heat transfer tubes 137 to the holes. That is, the heat transfer tubes 137 may be coupled to the lower heat transfer tube sheet 135 and the upper heat transfer tube sheet 136 by inserting the heat transfer tubes 137 into the holes. The heat transfer tubes 137 are straight from the lower heat transfer tube sheet 135 to the upper heat transfer tube sheet 136, and a fluid may flow in the heat transfer tubes 137.

Primary cooling water heated to a high temperature and flowing out from the core 114 flows in the heat transfer tubes 137 arranged in the high-temperature parts 141, and after passing through the heat transfer tubes 137 arranged in the high-temperature parts 141 of the steam generator 130, the primary cooling water flows in the heat transfer tubes 137 arranged in the low-temperature parts 142 in a direction from the steam generator 130 toward the core 114.

Figure 6:
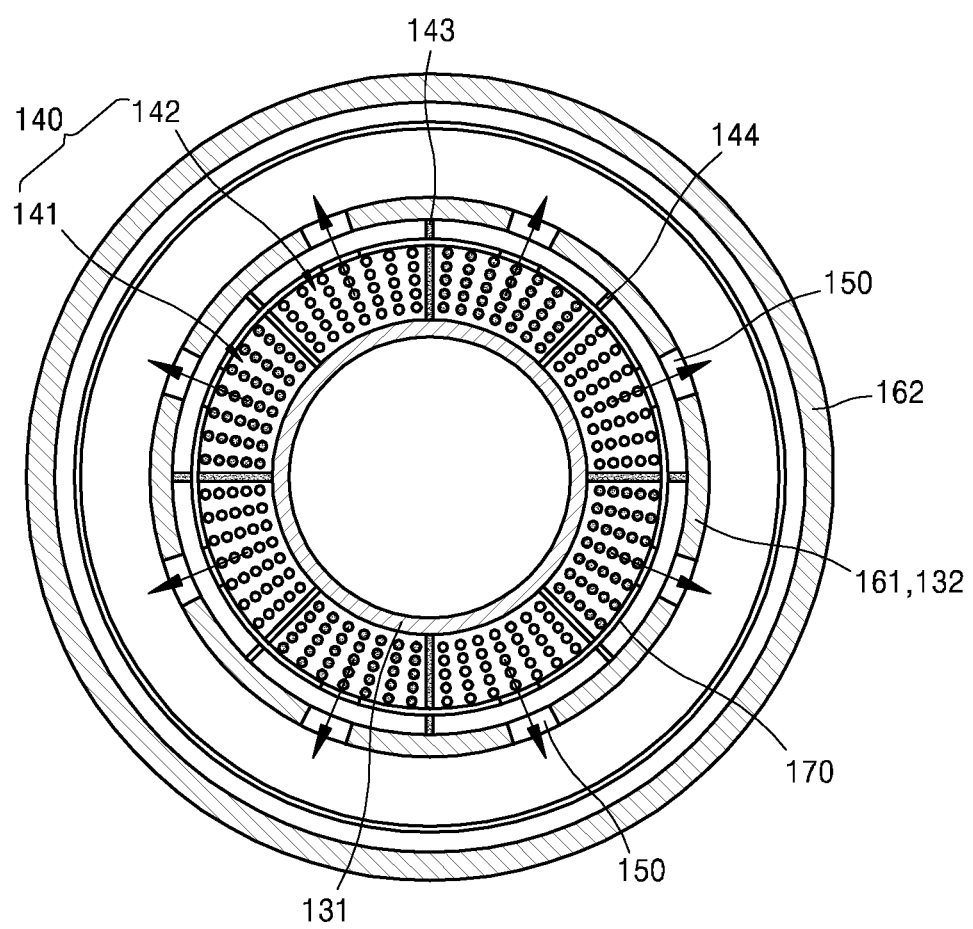
FIG. 6 is a cross sectional view taken along a line C-C of FIG. 2, illustrating a lower portion of the externally integrated steam generator type small modular reactor based on the line C-C according to an embodiment.

Referring to FIGS. 2 and 6, the steam drum 160 surrounds the circumference of the steam generator 130 and includes the second penetration holes 150 communicating with the inside of the steam generator 130. That is, the steam drum 160 surrounds 360 degrees the steam generator 130.

The steam drum 160 includes: a steam drum inner shell 161 integrated with or formed in one piece with the steam generator outer shell 132 and surrounding 360 degrees the circumference of the steam generator outer shell 132, the steam drum inner shell 161 extending in the longitudinal direction of the reactor vessel cylindrical shell 112; and a steam drum outer shell 162 spaced apart from the steam drum inner shell 161 and surrounding the circumference of the steam generator 130, the steam drum outer shell 162 extending in the longitudinal direction of the reactor vessel cylindrical shell 112.

The steam drum inner shell 161 and the steam generator outer shell 132 are integrated with or formed in one piece with each other and share a shell with each other. The steam drum inner shell 161 may be integrated with or formed in one piece with the steam generator outer shell 132 and a portion of the steam generator upper head 133. The steam drum inner shell 161 extends upward from the steam generator outer shell 132 in the longitudinal direction of the reactor vessel cylindrical shell 112.

The steam drum outer shell 162 is spaced apart from the steam drum inner shell 161 and surrounds 360 degrees the steam generator 130. That is, the steam drum inner shell 161 and the steam drum outer shell 162 surround the steam generator 130 and have a doughnut-shaped cross section. Referring to FIG. 6, the steam drum inner shell 161 and the steam drum outer shell 162 have a doughnut-shaped cross section in which the steam generator 130 is placed.

The steam drum 160 may further include: a steam drum upper head 163 connecting an upper portion of the steam drum inner shell 161 to an upper portion of the steam drum outer shell 162; and a steam drum lower head 164 connecting a lower portion of the steam drum outer shell 162 to the steam generator outer shell 132.

The steam drum upper head 163 has a semicircular cross section and extends in a ring shape along the circumference of the steam drum 160. That is, the steam drum upper head 163 has a semicircular cross section and surrounds an upper portion of the steam drum 160 in a doughnut shape. Steam outlet nozzles 165 communicating with the outside may be formed in an upper portion of the steam drum upper head 163. Steam generated in the steam generator 130 and the steam drum 160 may be discharged through the steam outlet nozzles 165. The steam drum upper head 163 may have a semicircular shape. However, the steam drum upper head 163 is not limited thereto. For example, the steam drum upper head 163 may have another shape such as a semielliptical shape.

The steam drum lower head 164 has a circular-arc cross section and extends in a ring shape along the circumference of the steam drum 160. That is, the steam drum lower head 164 has a circular-arc cross section and connects the steam drum outer shell 162 to the steam generator outer shell 132 while surrounding a lower portion of the steam drum 160 in a doughnut shape. Since the steam drum lower head 164 has a circular-arc cross section, a fluid may smoothly flow along the shape of the steam drum lower head 164. In a non-limiting example, the steam drum lower head 164 may have a quarter-circular cross section. However, the steam drum lower head 164 may have another circular-arc cross sectional shape.

Referring to FIG. 6, the second penetration holes 150 function as flow paths allowing a fluid to flow between the inside of the steam generator 130 and the inside of the steam drum 160. That is, openings are formed in the steam drum 160 to allow a fluid to flow to the inside of the steam generator 130. In other words, owing to the second penetration holes 150, the steam drum 160 is connected to the steam generator 130 without using pipes, and a fluid may flow therebetween. The second penetration holes 150 may be provided in a region in which the steam drum inner shell 161 and the steam generator outer shell 132 are integrated with or formed in one piece with each other.

Moisture separators 166 and steam dryers 167 may be provided in the steam drum 160. The moisture separators 166 and the steam dryers 167 may be used to remove moisture from steam and then discharge dried pure steam, and since the moisture separators 166 and the steam dryers 167 are well known in the art, descriptions thereof will not be presented here.

Referring to FIG. 2, a circular-arc shaped shroud 170 may extend from the inside of the steam drum lower head 164 to the inside of the steam generator outer shell 132 and may extend in a ring shape along the circumference of the steam drum lower head 164 and the circumference of the steam generator outer shell 132. That is, the shroud 170 may extend along the circular-arc shape of the steam drum lower head 164 and may further extend along the steam generator outer shell 132.

The shroud 170 may be a plate dividing the inside of the steam drum 160 and the inside of the steam generator 130 and may be placed between the steam generator outer shell 132 and the heat transfer tubes 137 (that is, the heat transfer tubes 137 may be arranged in a region of the steam generator 130 located inside the shroud 170, and a separate space may be formed in a region of the steam generator 130 located outside the shroud 170).

Although the inside of the steam generator 130 may be divided by the shroud 170, the shroud 170 does not extend to the lower portion of the steam generator 130. Therefore, an inner space of the lower portion of the steam generator 130 is not divided.

Condensation formed by the moisture separators 166 and the steam dryers 167 provided inside the steam drum 160 may flow along the separate space formed by the shroud 170. After flowing along the separate space formed by the shroud 170, the condensation may flow back to the inside of the steam generator 130 from the lower portion of the steam generator 130. Owing to the shroud 170, condensation formed by the moisture separators 166 and the steam dryers 167 may be reused.

Control rod driving devices 190 are installed in the upper head 111 of the nuclear reactor 110, and nozzles connected to a pressurizer injection system and a discharge system of a reactor coolant system are installed in the upper head 111 of the nuclear reactor 110. The control rod driving devices 190 are inserted into the upper head 111 and connected to the core 114 through guide tubes.

Figure 7:
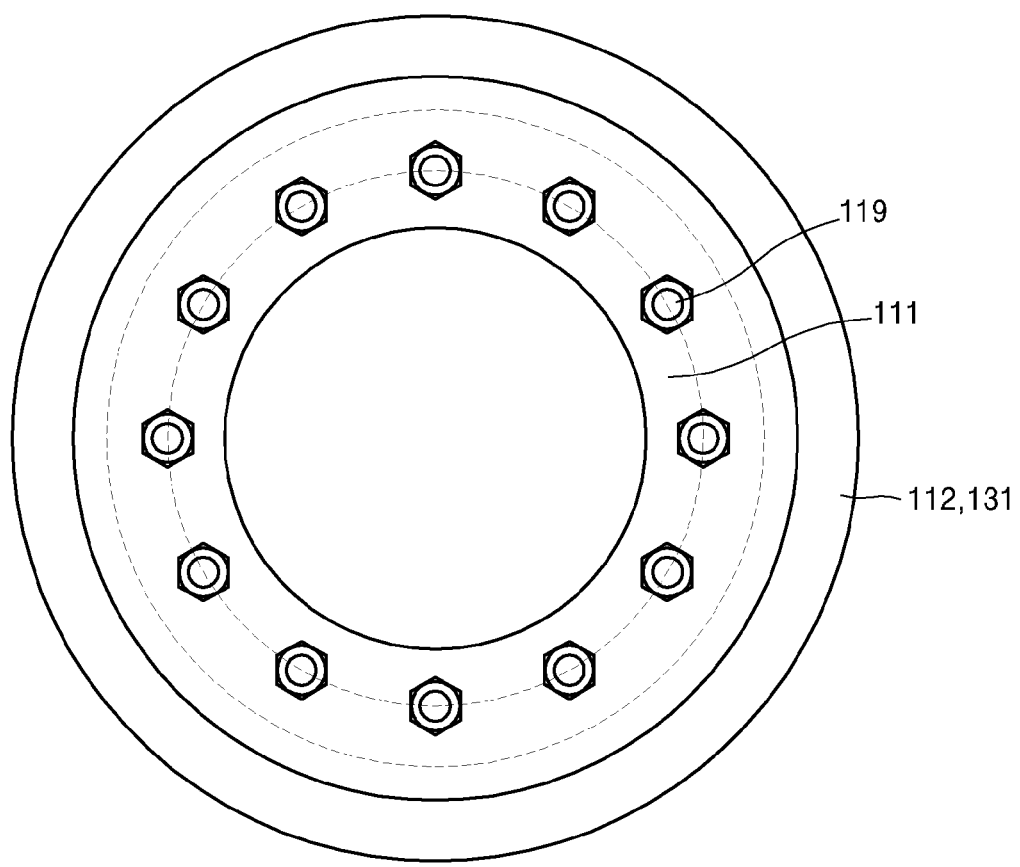
FIG. 7 is a plan view illustrating an assembled state of a reactor vessel cylindrical shell and an upper head according to an embodiment.

A cylindrical shell flange 117 protruding inward from the reactor vessel cylindrical shell 112 and having stud bolt holes is provided on the reactor vessel cylindrical shell 112, and an upper head flange 118 protruding outward from the upper head 111 and having stud bolt holes is provided on the upper head 111. Referring to FIGS. 2 and 7, the upper head 111 and the reactor vessel cylindrical shell 112 may be coupled to each other by joining the upper head flange 118 and the cylindrical shell flange 117 to each other using stud bolts. For example, the upper head 111 and the reactor vessel cylindrical shell 112 may be coupled to each other using stud bolts 119. In this case, the upper head 111 and the reactor vessel cylindrical shell 112 may be easily coupled and separated.

Figure 8:
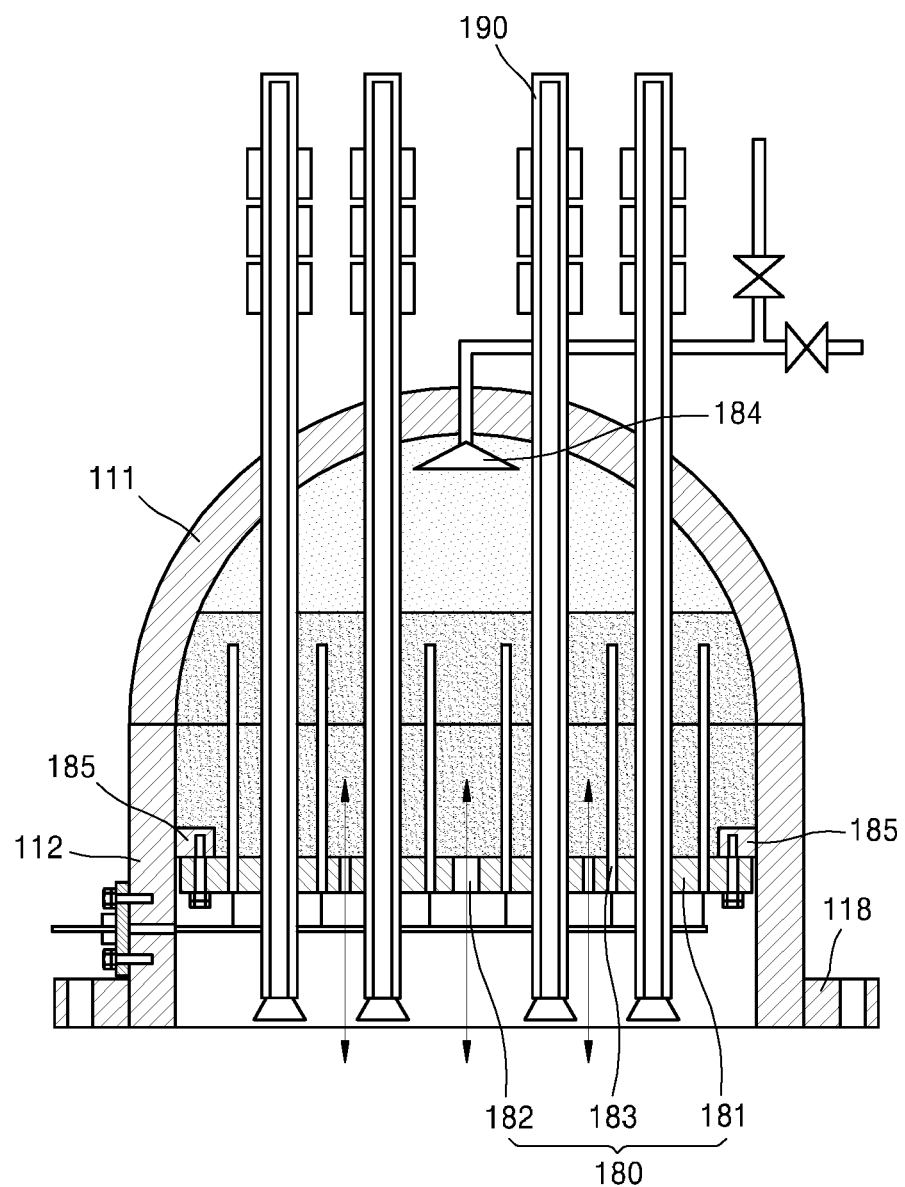
FIG. 8 is a cross sectional view illustrating a pressurizer provided in a nuclear reactor according to an embodiment.

Referring to FIG. 8, a pressurizer plate 181 in which surge holes 182 are formed to allow a fluid to pass therethrough and electric heaters 183 are installed to heat a fluid may be provided in the nuclear reactor 110. For example, a pressurizer 180 including the surge holes 182, the electric heaters 183, and the pressurizer plate 181 may be provided in the upper head 111 of the nuclear reactor 110. The pressurizer 180 may adjust the inside pressure of the core 114, and a fluid may be introduced between the pressurizer plate 181 and the upper head 111 to adjust the inside pressure of the core 114. The pressurizer 180 may include a spray 184 to adjust the pressure of the fluid. The pressure of the core 114 may be adjusted using the pressurizer 180 by a well-know method, and thus a description thereof will not be presented here.

The pressurizer plate 181 may be provided in a lower portion of the upper head 111 or at a position at which the reactor vessel cylindrical shell 112 and the upper head 111 meet each other. The pressurizer plate 181 may be installed using a protrusion 185 which has stud bolt holes and protrudes inward from the nuclear reactor 110 in a ring shape. The pressurizer plate 181 may be coupled to the protrusion 185 using stud bolts.

Figure 9:
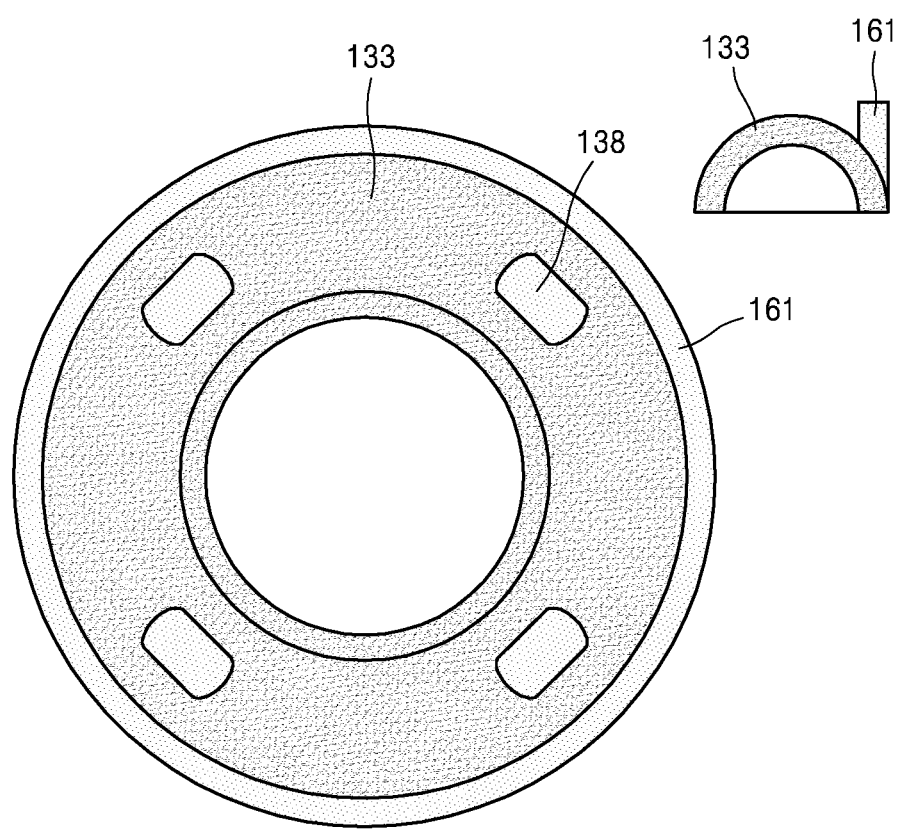
FIG. 9 is a plan view illustrating manways provided on the upper head according to an embodiment.

Referring to FIG. 9, manways 138 are detachably coupled to the steam generator upper head 133 or the steam generator lower head 134. The manways 138 are detachably coupled to the steam generator upper head 133 or the steam generator lower head 134 using stud bolts, and maintenance work may be performed on the inside of the steam generator 130 after detaching the manways 138.

In the externally integrated steam generator type small modular reactor of the embodiment, heat generated in the core 114 is distributed using a fluid. Fluid flow in the externally integrated steam generator type small modular reactor is as follows.

Referring to FIGS. 2 and 3, the first penetration holes 120 connecting the steam generator 130 to the nuclear reactor 110 may include first entrance penetration holes 121 communicating with the high-temperature parts 141 of the steam generator 130 and first exit penetration holes 122 communicating with the low-temperature parts 142 of the steam generator 130. Along with this, a cylindrical core support barrel assembly 115 in which the core 114 is placed is provided in the nuclear reactor 110, and the core support barrel assembly 115 extends in the longitudinal direction of the reactor vessel cylindrical shell 112.

That is, the core 114 is placed in the cylindrical core support barrel assembly 115 provided inside the nuclear reactor 110. The core support barrel assembly 115 includes core penetration holes 116 communicating with the first entrance penetration holes 121, and thus primary cooling water may flow from the core 114 to the first entrance penetration holes 121 through the core penetration holes 116. Since the first entrance penetration holes 121 communicate with the high-temperature parts 141, primary cooling water may flow from the core 114 to the high-temperature parts 141.

The first exit penetration holes 122 communicate with a space formed between the reactor vessel cylindrical shell 112 and the core support barrel assembly 115. That is, after passing through the low-temperature parts 142, primary cooling water flows to the space between the reactor vessel cylindrical shell 112 and the core support barrel assembly 115 through the first exit penetration holes 122.

Fluid flow in the externally integrated steam generator type small modular reactor will now be described with reference to FIG. 2. Primary cooling water is heated to a high temperature in the core 114 and then flows to the high-temperature parts 141 through the core penetration holes 116 of the core support barrel assembly 115 and the first entrance penetration holes 121. Exit nozzles 1161 connected from the reactor vessel cylindrical shell 112 to the core support barrel assembly 115 are provided under the core penetration holes 116. Owing to the exit nozzles 1161, the primary cooling water may not flow to the space between the reactor vessel cylindrical shell 112 and the core support barrel assembly 115.

The primary cooling water introduced into the high-temperature parts 141 flows along the heat transfer tubes 137 to the upper head 133 of the steam generator 130 through the lower heat transfer tube sheet 135. At this time, a region among the steam generator inner shell 131, the steam generator outer shell 132, and the heat transfer tubes 137 is filed with secondary cooling water, and thus heat is exchanged between the primary cooling water flowing in the heat transfer tubes 137 and the secondary cooling water flowing outside the heat transfer tubes 137 (that is, the inside of the steam generator 130 is filled with the secondary cooling water except for the heat transfer tubes 137).

Referring to FIG. 4, primary cooling water introduced into the high-temperature parts 141 flows to the low-temperature parts 142 through the upper heat transfer tube sheet 136 and the steam generator upper head 133. The primary cooling water introduced into the low-temperature parts 142 flows along the heat transfer tubes 137 to the lower portion of the steam generator 130, and thus heat exchange occurs once again between the primary cooling water flowing in the heat transfer tubes 137 and the secondary cooling water filled outside the heat transfer tubes 137. The primary cooling water flows from the low-temperature parts 142 to the first exit penetration holes 122 through the lower heat transfer tube sheet 135 and then flows to the lower head 113 through the space between the reactor vessel cylindrical shell 112 and the core support barrel assembly 115. Thereafter, the primary cooling water flows back to the core 114 from the lower head 113, and thus the primary cooling water may be reused. In this case, reactor coolant pumps 123 may be provided at the first exit penetration holes 122 for smooth fluid flow.

The secondary cooling water may be filled among the steam generator inner shell 131, the steam generator outer shell 132, and the heat transfer tubes 137 by using feed water nozzles 139 and supply water distributors 1391 provided in a lower region of the steam generator outer shell 132. While the secondary cooling water flows outside the heat transfer tubes 137 toward the upper portion of the steam generator 130, the secondary cooling water changes heat with the primary cooling water flowing inside the heat transfer tubes 137 and is thus heated and changed to steam by heat received from the primary cooling water. The steam and remaining heated secondary cooling water are introduced into the steam drum 160 through the second penetration holes 150 and are increased in the degree of dryness and changed into saturated steam while passing through the moisture separators 166 and the steam dryers 167 of the steam drum 160, and the saturated steam is discharged through the steam outlet nozzles 165.

Owing to the shroud 170, condensation formed by the moisture separators 166 and the steam dryers 167 may be reused as secondary cooling water. The shroud 170 extends from a lower portion of the steam drum lower head 164 to the steam generator outer shell 132 and divides inner spaces of the steam drum 160 and the steam generator 130.

A fluid condensed by the moisture separators 166 and the steam dryers 167 flows downward along the shroud 170 toward the lower portion of the steam generator 130 and is then reused as secondary cooling water. Since the shroud 170 does not extend to the lower portion of the steam generator 130, a space in the lower portion of the steam generator 130 is not divided by the shroud 170. Therefore, after flowing along the shroud 170, secondary cooling water may flow from the lower portion of the steam generator 130 to the inside of the steam generator 130 through the supply water distributors 1391 and may be reused in the steam generator 130.

According to an embodiment, when nuclear fuel of the core 114 of the externally integrated steam generator type small modular reactor is replaced, the upper head 111 may be detached and lifted, and an upper portion of the nuclear reactor 110 may be filled with water (refueling water) so as to block radiation passing through the upper portion of the nuclear reactor 110.

Since the steam generator inner shell 131 extends upward from the reactor vessel cylindrical shell 112, a space 1311 surrounded by the steam generator inner shell 131 is formed on an upper portion of the reactor vessel cylindrical shell 112 (since the steam generator inner shell 131 surrounds the reactor vessel cylindrical shell 112 in a ring shape, the space 1311 surrounded by the steam generator inner shell 131 has a cylindrical shape). The cylindrical space 1311 surrounded by the steam generator inner shell 131 may be filled with a fluid after the upper head 111 is detached and lifted, and thus the steam generator inner shell 131 may function as a water pool (refueling water pool). In this manner, water for blocking radiation passing through the upper portion of the nuclear reactor 110 may be filled in the cylindrical space 1311 surrounded by the steam generator inner shell 131.

The externally integrated steam generator type small modular reactor of the embodiment may have the following effects.

In the externally integrated steam generator type small modular reactor of the embodiment, the steam generator 130 is arranged along the circumference of the nuclear reactor 110, and the steam drum 160 is arranged along the circumference of the steam generator 130. Therefore, the heat-transfer area of the steam generator 130 may be increased, and the externally integrated steam generator type small modular reactor may have a simple structure and a high degree of space utilization efficiency. That is, owing to the concentric structure formed by arranging the steam generator 130 along the outer circumference of the nuclear reactor 110 and the steam drum 160 along the outer circumference of the steam generator 130, problems relating to spatial efficiency may be solved.

Since structures such as the steam generator 130 and the steam drum 160 are spatially separated from the inside of the nuclear reactor 110, the inside space of the nuclear reactor 110 may be efficiently used, and thus components such as the pressurizer 180 may be easily placed in the nuclear reactor 110. In addition, since the steam drum 160 is arranged along the circumference of the steam generator 130 and the second penetration holes 150 are formed in the steam drum 160, the heat transfer tubes 137 of the steam generator 130 may be completely immersed in a liquid-phase fluid, and thus the heat transfer tubes 137 may not be overheated and damaged.

The first penetration holes 120 are provided in a structure in which the reactor vessel cylindrical shell 112 and the steam generator inner shell 131 are integrated with or formed in one piece with each other, and the second penetration holes 150 are provided in a structure in which the steam generator outer shell 132 and the steam drum inner shell 161 are integrated with or formed in one piece with each other. Therefore, the externally integrated steam generator type small modular reactor of the embodiment may be designed without using pipes. Large nuclear power plants of the related art use pipes, and thus the risk of pipe break is always present. However, the embodiment realizes designs not using pipes, and thus dynamic loads caused by pipe break may not be applied to components, structures, and systems, and thus the amount of engineering work for designing and analysis may be reduced.

According to the embodiment, the steam generator 130 is arranged along the circumference of the reactor vessel cylindrical shell 112, and thus the design of the steam generator 130 may be easily modified. In small-medium modular reactors of the related art, a steam generator is integrated with an inner side of a nuclear reactor, and thus it is difficult to change the design of the steam generator due to a limited space of the nuclear reactor. According to the embodiment, however, the steam generator 130 is arranged along the circumference of the reactor vessel cylindrical shell 112, and thus if necessary, the design of the steam generator 130 may be easily modified. Owing to the same reason, the design of the steam drum 160 may be easily modified.

In the small-medium modular reactor of the related art, a complex structure is used to maintain a pressure boundary between primary cooling water used in the core 30 and secondary cooling water used in the steam generator 20 provided in the reactor vessel 10. In addition, since the pressure boundary between primary cooling water and secondary cooling water is scattered in the reactor vessel 10, a complex structure is required to maintain the pressure boundary. According to the embodiment, however, since the steam generator 130 is arranged along the circumference of the reactor vessel cylindrical shell 112, space may be easily utilized, and a pressure boundary of cooling water may be simply maintained using the lower heat transfer tube sheet 135, the upper heat transfer tube sheet 136, and the heat transfer tubes 137 provided in the steam generator 130.

In addition, since the steam generator modules 140 each including the high-temperature part 141 and the low-temperature part 142 are independently provided in the steam generator 130, the number of the steam generator modules 140 may be increased according to the design and capacity of the reactor coolant system.

According to the embodiment, secondary cooling water may be reused owing to the shroud 170. In addition, although the heat transfer tubes 137 of the steam generator 130 of the embodiment are straight, the steam generator 130 may have the same function as a U-tube type steam generator owing to the steam generator upper head 133.

Along with this, the manways 138 are detachably provided in the steam generator upper head 133 or the steam generator lower head 134. Owing to the manways 138, maintenance of the steam generator 130 may be easily performed, and since the heat transfer tubes 137 of the steam generator 130 are straight, the heat transfer tubes 137 may be easily replaced compared to heat transfer U-tubes.

In an integration design of the related art for installing a pressurizer in a nuclear reactor, access paths for inspection and maintenance of the inside of the pressurizer and a penetration portion of a reactor upper head are limited. In the externally integrated steam generator type small modular reactor of the embodiment, however, the protrusion 185 is provided inside the nuclear reactor 110, and the pressurizer plate 181 is coupled to the protrusion 185 using stud bolts. Therefore, the pressurizer plate 181 may be easily detached, and inspection and maintenance may be easily performed on the inside of the pressurizer 180.

In addition, according to the embodiment, the upper head 111 and the reactor vessel cylindrical shell 112 are coupled to each other by joining the cylindrical shell flange 117 provided on the reactor vessel cylindrical shell 112 to the upper head flange 118 provided on the upper head 111 by using stud bolts 119. Therefore, the upper head 111 may be easily detached from the reactor vessel cylindrical shell 112, and thus an access path for inspection and maintenance of a penetration portion of the upper head 111 of the nuclear reactor 110 may be secured.

In addition, when nuclear fuel of the core 114 is replaced, the upper head 111 is detached and lifted, and the core 114 is replaced. Radiation passing through the upper portion of the nuclear reactor 110 is blocked when the core 114 is replaced, and to this end, the upper portion of the nuclear reactor 110 is filled with water (refueling water). According to the embodiment, the cylindrical space 1311 surrounded by the steam generator inner shell 131 is provided on the upper portion of the reactor vessel cylindrical shell 112. Therefore, the cylindrical space 1311 may be used as a refueling water pool to fill water (refueling water) therein when the core 114 is replaced, and thus radiation passing through the upper portion of the nuclear reactor 110 may be blocked during the replacement of the core 114.

According to the externally integrated steam generator type small modular reactor of the embodiment, the heat-transfer area of the steam generator 130 may be increased. In addition, since pipe break is prevented, weight reduction, relaxation of environmental qualification conditions, and reduction in the capacity of a safe injection system for emergency core cooling may be achieved. In addition, since the steam generator 130 and the steam drum 160 are integrated with the outer side of the nuclear reactor 110, space utilization efficiency may be increased, and maintenance work may be easily performed. Furthermore, since the steam generator 130 is provided outside the nuclear reactor 110, the capacity and size of the steam generator 130 may be flexibly determined.

The externally integrated steam generator type small modular reactor of the embodiment may be manufactured as follows.

The externally integrated steam generator type small modular reactor of the embodiment may be manufactured by coupling a plurality forged members or materials to each other. Since the steam generator 130 and the steam drum 160 are arranged in a ring shape along the circumference of the nuclear reactor 110, formation of particular structures such as joining and welding of vessels or shells should be guaranteed. Thus, the externally integrated steam generator type small modular reactor of the embodiment may be manufactured by manufacturing a plurality forged members and welding the forged members.

Figure 10:
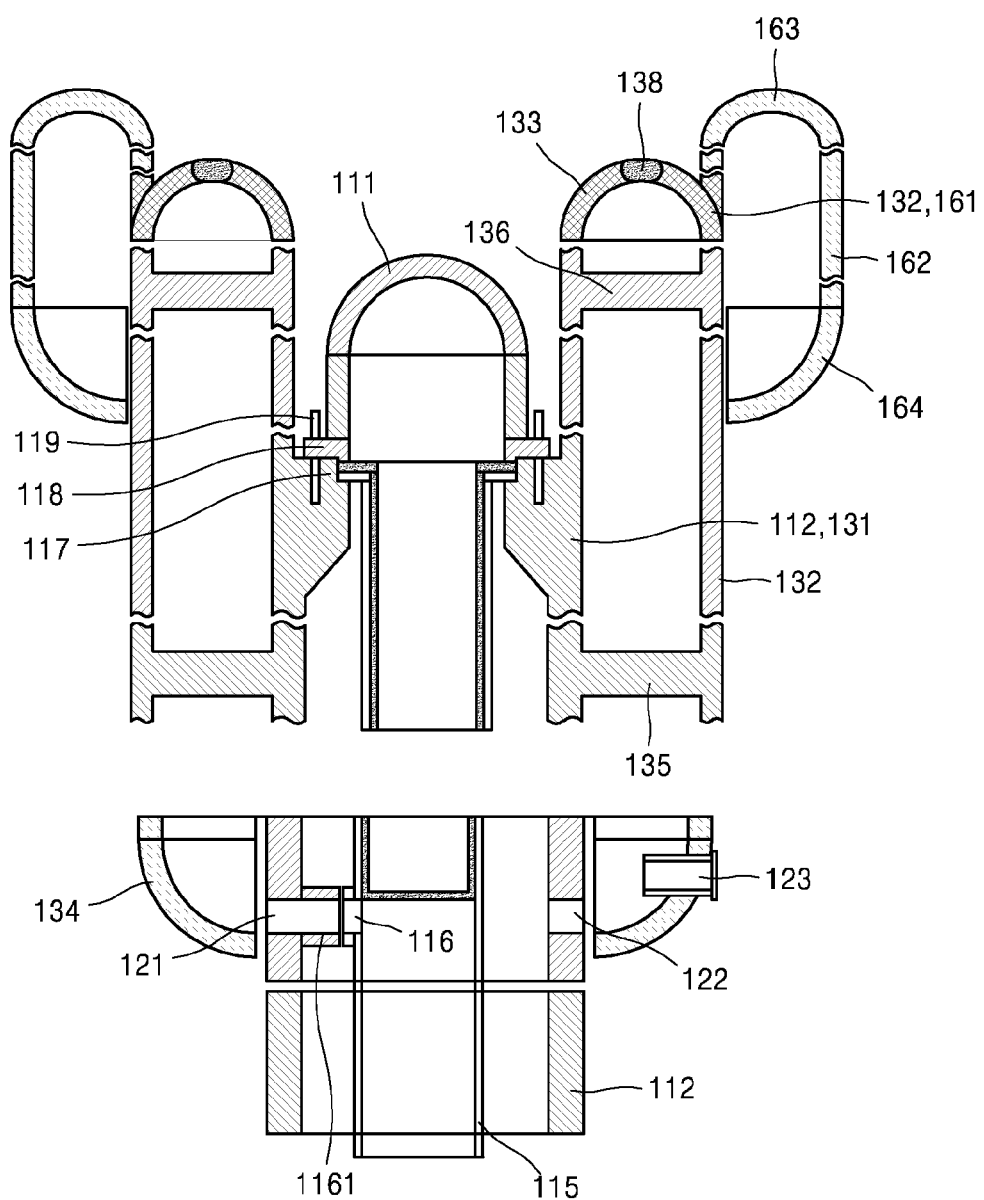
FIG. 10 is view illustrating forged members for the externally integrated steam generator type small modular reactor according to an embodiment.

Referring to FIG. 10, the forged members may be distinguished as follows: a forged member for the cylindrical shell flange 117 and the steam generator inner shell 131; a forged member for the reactor vessel cylindrical shell 112 integrated with or formed in one piece with the steam generator inner shell 131; a forged member for the reactor vessel cylindrical shell 112, the lower heat transfer tube sheet 135, and the steam generator outer shell 132; a forged member for the steam generator lower head 134; a forged member for the steam generator inner shell 131, the upper heat transfer tube sheet 136, and the steam generator outer shell 132; a forged member for the steam generator upper head 133 and the steam drum inner shell 161; a forged member for the steam generator inner shell 131; a forged member for the steam generator outer shell 132; a forged member for the reactor vessel cylindrical shell 112; a forged member for the steam drum lower head 164; a forged member for the steam drum outer shell 162; a forged member for the steam drum inner shell 161; a forged member for the steam drum upper head 163; a forged member for the upper head 111; etc.

Figure 11:
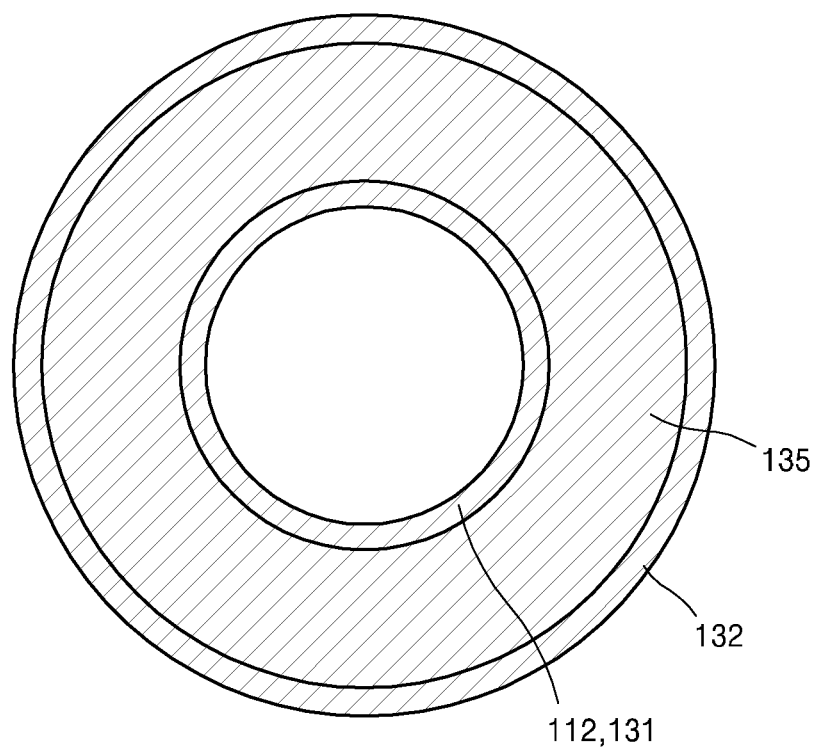
FIG. 11 is a plan view illustrating a forged member for the reactor vessel cylindrical shell, a lower heat transfer tube sheet, and a steam generator outer shell according to an embodiment.

Basically, the forged members may be manufactured in a ring shape. For example, the steam generator lower head 134 may be a doughnut-shaped forged member having a circular cross section, and referring to FIG. 11, the forged member for the reactor vessel cylindrical shell 112, the lower heat transfer tube sheet 135, and the steam generator outer shell 132 may have a ring shape.

The above-described forged members may be welded to each other to manufacture the externally integrated steam generator type small modular reactor of the embodiment. Distinguishment of forged members is not limited to the above-described method. That is, various forged members may be used according to manufacturing conditions. If the externally integrated steam generator type small modular reactor is manufactured using the forged members and the manufacturing method described above, the externally integrated steam generator type small modular reactor may be simply manufactured with low costs in a short construction time.

As described above, according to the one or more of the above embodiments, the steam generator 130 is arranged along the circumference of the nuclear reactor 110, and the steam drum 160 is arranged along the circumference of the steam generator 130. Therefore, the heat transfer area of the steam generator 130 may be increased. In addition, since pipe break is prevented, weight reduction, relaxation of environmental qualification conditions, and reduction in the capacity of a safe injection system for emergency core cooling may be achieved.

In addition, since the steam generator 130 and the steam drum 160 are integrated with the outside of the nuclear reactor 110, space utilization efficiency may be increased, and maintenance work may be easily performed. Furthermore, since the steam generator 130 is provided outside the nuclear reactor 110, the capacity and size of the steam generator 130 may be flexibly determined.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus comprising:
   a nuclear reactor comprising an upper head, a reactor vessel shell coupled to the upper head, the reactor vessel shell comprising a cylindrical shape, a lower head provided on a lower portion of the reactor vessel shell, and a core located within an interior of the nuclear reactor;
   a steam generator surrounding a circumference of the reactor vessel shell, the steam generator comprising a first penetration hole in fluid communication with the interior of the nuclear reactor such that a fluid flows between the interior of the nuclear reactor and an interior of the steam generator; and
   a steam drum surrounding a circumference of the steam generator and comprising a second penetration hole in fluid communication with an interior of the steam generator such that a fluid flows between an interior of the steam drum and the interior of the steam generator, wherein the steam generator further comprises:

a steam generator inner shell connected to or formed in one piece with the reactor vessel shell and surrounding 360 degrees the circumference of the reactor vessel shell, wherein the steam generator inner shell shares a portion with the reactor vessel shell and extends in a longitudinal direction of the reactor vessel shell; and a steam generator outer shell spaced apart from the steam generator inner shell and surrounding 360 degrees the circumference of the reactor vessel shell, wherein the steam generator outer shell extends in the longitudinal direction of the reactor vessel shell, wherein the steam drum further comprises:

a steam drum inner shell connected to or formed in one piece with the steam generator outer shell and surrounding 360 degrees the circumference of the steam generator, wherein the steam drum inner shell shares a portion with the steam generator outer shell and extends in the longitudinal direction of the reactor vessel shell; and a steam drum outer shell spaced apart from the steam drum inner shell and surrounding 360 degrees the circumference of the steam generator, the steam drum outer shell extending in the longitudinal direction of the reactor vessel shell, wherein the first penetration hole is provided in a region in which the reactor vessel shell and the steam generator inner shell are connected to or formed in one piece with each other and is used as a flow path allowing a fluid to flow between the interior of the nuclear reactor and the interior of the steam generator, wherein the second penetration hole is provided in a region in which the steam generator outer shell and the steam drum inner shell are connected to or formed in one piece with each other and is used as a flow path allowing a fluid to flow between the interior of the steam generator and the interior of the steam drum.

2. The apparatus of claim 1, wherein the steam generator further comprises:

a steam generator upper head connecting an upper portion of the steam generator inner shell to an upper portion of the steam generator outer shell; and a steam generator lower head connecting a lower portion of the steam generator outer shell to the reactor vessel shell, wherein the steam generator upper head has a semicircular or semielliptical cross section and extends in a ring shape along the circumference of the steam generator, and the steam generator lower head has a circular-arc cross section and extends in a ring shape along the circumference of the steam generator.

3. The apparatus of claim 2, wherein a manway is detachably coupled to the steam generator upper head or the steam generator lower head.

4. The apparatus of claim 1, wherein a plurality of first partition plates are arranged at intervals inside the steam generator along the circumference of the steam generator, and steam generator modules each comprising a high-temperature part and a low-temperature part are provided in spaces separated by the first partition plates, and each of the steam generator modules comprises a second partition plate separating the high-temperature part and the low-temperature part from each other.

5. The apparatus of claim 4, wherein the first penetration hole comprises a first entrance penetration hole communicating with the high-temperature part and a first exit penetration hole communicating with the low-temperature part;

a cylindrical core support barrel assembly extending in the longitudinal direction of the reactor vessel shell and accommodating the core is provided inside the nuclear reactor; and the core support barrel assembly comprises a core penetration hole communicating with the first entrance penetration hole, and the first exit penetration hole communicates with a space between the reactor vessel shell and the core support barrel assembly.

6. The apparatus of claim 1, wherein a lower heat transfer tube sheet is provided in a lower portion of the steam generator, the lower heat transfer tube sheet being coupled to the steam generator inner shell and the steam generator outer shell and having a plate shape along the circumference of the steam generator;

an upper heat transfer tube sheet is provided in an upper portion of the steam generator, the upper heat transfer tube sheet being coupled to the steam generator inner shell and the steam generator outer shell having a plate shape along the circumference of the steam generator; and the externally integrated steam generator type small modular reactor further comprises a heat transfer tube coupled to the lower heat transfer tube sheet and the upper heat transfer tube sheet and extending straight from the lower heat transfer tube sheet to the upper heat transfer tube sheet.

7. The apparatus of claim 6, wherein the lower heat transfer tube sheet or the upper heat transfer tube sheet is connected to or formed in one piece with the steam generator inner shell and the steam generator outer shell.

8. The apparatus of claim 1, wherein the steam drum further comprises:

a steam drum upper head connecting an upper portion of the steam drum inner shell to an upper portion of the steam drum outer shell; and a steam drum lower head connecting a lower portion of the steam drum outer shell to the steam generator outer shell, wherein the steam drum upper head has a semicircular or semielliptical cross section and extends in a ring shape along a circumference of the steam drum, and the steam drum lower head has a circular-arc cross section and extends in a ring shape along the circumference of the steam drum.

9. The apparatus of claim 8, wherein a steam outlet nozzle is formed in the steam drum upper head.

10. The apparatus of claim 8, wherein a moisture separator and a steam dryer are provided in the steam drum.

11. The apparatus of claim 8, further comprising a circular-arc shaped shroud extending from an inside of the steam drum lower head to an inside of the steam generator outer shell, the shroud extending in a ring shape along a circumference of the steam drum lower head and a circumference of the steam generator outer shell.

12. The apparatus of claim 1, wherein a pressurizer plate in which a surge hole is formed to allow a fluid to pass therethrough and an electric heater is installed to heat a fluid is provided in the nuclear reactor.

13. The apparatus of claim 12, wherein a protrusion protruding inward from the nuclear reactor and having a stud bolt hole is provided on the nuclear reactor, and the pressurizer plate is coupled to the protrusion using a stud bolt.

14. The apparatus of claim 1, wherein a cylindrical shell flange protrudes inward from the reactor vessel shell and comprises a stud bolt hole, an upper head flange protrudes outward from the upper head and comprises a stud bolt hole, and the upper head and the reactor vessel shell are coupled to each other by joining the cylindrical shell flange and the upper head flange using a stud bolt.

15. The apparatus of claim 1, wherein the apparatus is manufactured by coupling a plurality of forged members to each other.

16. The apparatus of claim 1, wherein a space formed on an upper portion of the reactor vessel shell and surrounded by the steam generator inner shell is configured to be filled with a fluid.

* * * * *